United States Patent [19]
Fall et al.

[11] Patent Number: 5,430,724
[45] Date of Patent: Jul. 4, 1995

[54] TDMA ON A CELLULAR COMMUNICATIONS SYSTEM PCM LINK

[75] Inventors: Sven O. P. Fall, Upplands Väsby, Sweden; Sven E. Nilsson, Dallas, Tex.; Sven G. Svensson, Vällingby, Sweden

[73] Assignee: Telefonaktiebolaget L M Ericsson, Stockholm, Sweden

[21] Appl. No.: 85,153

[22] Filed: Jul. 2, 1993

[51] Int. Cl.⁶ ............................. H04J 3/06; H04L 7/00
[52] U.S. Cl. .................................... 370/79; 370/95.3; 370/105.1
[58] Field of Search .................. 370/79, 80, 82, 95.1, 370/95.3, 97, 99, 100.1, 103, 105.1, 109, 118; 379/59, 63; 455/33.1

[56] References Cited

U.S. PATENT DOCUMENTS

| | | | |
|---|---|---|---|
| 4,286,334 | 8/1981 | Gammel et al. | 375/40 |
| 4,701,939 | 10/1987 | Stutt et al. | 375/115 |
| 4,872,171 | 10/1989 | Wakumura et al. | 371/40.1 |
| 5,072,449 | 12/1991 | Enns et al. | 371/37.1 |
| 5,111,454 | 5/1992 | Hung et al. | 370/109 X |
| 5,123,014 | 6/1992 | Federkins et al. | 370/110.1 |
| 5,128,945 | 7/1992 | Enns et al. | 371/37.1 |
| 5,146,609 | 9/1992 | Tayloe et al. | 455/33.2 |
| 5,148,431 | 9/1992 | Hayashi | 371/5.1 |
| 5,150,362 | 9/1992 | Akerberg | 370/95.1 |
| 5,195,090 | 3/1993 | Bolliger et al. | 370/95.3 X |
| 5,293,380 | 3/1994 | Kondo | 370/95.3 |

FOREIGN PATENT DOCUMENTS

| | | |
|---|---|---|
| 0003633 | 8/1979 | European Pat. Off. |
| 2522772 | 1/1983 | European Pat. Off. |
| WO93/00778 | 2/1994 | WIPO |

OTHER PUBLICATIONS

Ericsson, "Telecommunications-Telephone Networks 1", pp. 27-37, first published in 1985 in Sweden.
Ericsson, "Telecommunications-Telephone Networks 2", pp. 110-115, first published in 1986 in Sweden.

Primary Examiner—Melvin Marcelo
Attorney, Agent, or Firm—Burns, Doane, Swecker & Mathis

[57] ABSTRACT

A cellular radio system, having a mobile services switching center (MSC) coupled to a base station by means of a pulse code modulation (PCM) link, has an apparatus comprising, in the MSC, a transcoder and rate adaptor (TRA) that generates a PCM frame from a plurality of user data blocks, each user data block corresponding to one of a plurality of users and each user data block comprising an integer number of bytes of data. In the PCM frame, each of the plurality of user data blocks occupies an integer number of consecutive bytes of the generated PCM frame, which is then output to the PCM link. The base station includes a channel encoder that generates an air interface frame from a plurality of user data blocks contained in a received PCM frame. The base station may also generate a timing control signal which is received by the MSC. A timing controller in the MSC is responsive to the received timing control signal, and causes the TRA to synchronize output of a generated PCM frame with generation of an air interface frame such that the generated PCM frame will arrive at the base station channel encoder substantially just at a moment when the generated PCM frame is needed by the channel encoder in order to generate the air interface frame without waiting for the generated PCM frame.

8 Claims, 4 Drawing Sheets

TDMA ON A CELLULAR COMMUNICATIONS SYSTEM PCM LINK

BACKGROUND

The present invention relates to radiotelephone communication systems and more particularly to a method and apparatus for reducing the delay in transmitting a block of speech to a mobile station, the delay being associated with the use of time division multiple access transmission of speech parameters on a pulse code modulation link between a mobile services switching center and a base station.

A cellular telephone communications system may include elements as shown in FIG. 1. Within the Public Land Mobile Network (PLMN) 100, a base station (BS) 103 is connected to a mobil services switching center (MSC) 101 by means of a first Pulse Code Modulation (PCM) link 107. The MSC is then linked to a Public Switched Telephone Network (PSTN) 115 by means of a second PCM link 113.

The MSC 101 has a Group Switch (GS) 111 for properly routing speech between the PSTN 115 and the appropriate base station 103. The MSC 101 also includes a Transcoder and Rate Adaptor (TRA) 109 which performs speech coding/decoding (data compression/expansion) and data rate adaptation of the speech signals that flow between the PSTN 115 and the base station 103. In operation, speech received by the MSC 101 via the second PCM link 113 is first compressed by the TRA 109, and then transmitted to the base station 103 by means of the first PCM link 107. This transmission preferably uses the error detection and handling mechanisms disclosed by commonly owned U.S. patent application Ser. No. 08/085,044, entitled "PCM LINK FAULT DETECTION AND LOST BLOCK HANDLING" by P. Sellin et al., filed on Jul. 2, 1993, the entire disclosure of which is hereby incorporated by reference. After it is received by the base station 103, the encoded speech is relayed to a mobile station (MS) 105. A speech coder-decoder (codec) (not shown) inside the mobile station 105 decodes the received speech parameters as part of the process of generating audible speech.

A similar set of operations takes place in the opposite direction. That is, speech originating in the mobile station 105 is encoded by the codec (not shown) located in the mobile station 105, and then transmitted to the base station 103. The encoded speech is then relayed, by means of the first PCM link 107, to the MSC 101. Inside the MSC 101, the encoded speech is decoded by the TRA 109, and then forwarded to the PSTN 115 by means of the GS 111 and the second PCM link 113.

The first PCM link 107 transmits data at a rate of 64 kilobits per second (kbit/s). However, this capacity is effectively increased by the fact that the speech being conveyed is compressed (i.e. encoded) as described above. The type of compression which is used in cellular telephone systems, such as the European Global System for Mobile Communication (GSM) or the American Digital Cellular (ADC) system, permits the 64 kbit/s connection to be shared by more than one voice and/or data channels (four channels for GSM, and three channels for ADC). It should be noted that this sharing is not possible on the second PCM link 113, which connects the PLMN 100 with the PSTN 115, because the signals conveyed on this link are not compressed. In practice, the MSC 101 is connected to multiple second PCM links 113, so that the MSC 101 may handle more than one connection at a time.

To understand the problem with the existing system, it is necessary to know how speech is encoded/decoded, how encoded speech/data from more than one connection is formatted for transmission on the first PCM link 107, and how encoded speech/data from more than one connection is formatted for transmission from the base station 103 to the mobile station 105. These topics will now be briefly discussed.

The TRA 109 collects 160 samples from each 20 ms of speech arriving from the PSTN 115 by means of the second PCM link 113. After the entire block of 160 speech samples has been collected, it is then processed and output from the TRA 109 as encoded speech. When an entire block of encoded speech has been collected, it is available for transmission to the base station 103 by means of the first PCM link 107. A block of encoded data consists of at least 159 bits of speech parameters.

As previously stated, the compression (encoding) of speech effectively increases the capacity of the first PCM link 107, so that it may be shared by more than one connection at a time. In known systems, such as GSM, this has been accomplished by formatting transmitted data as shown in FIG. 2. For every byte (8 bits) 201 of transmitted data, each of four users is allocated 2 bits. As illustrated in FIG. 2, User 1 transmits 2 bits of encoded speech and/or control data in bits B0 and B1, User 2 transmits 2 bits of encoded speech and/or control data in bits B2 and B3, User 3 transmits 2 bits of encoded speech and/or control data in bits B4 and B5, and User 4 transmits 2 bits of encoded speech and/or control data in bits B6 and B7. Then, the process starts all over again, with User 1 transmitting the next 2 bit of encoded data and/or control data in bits B0 and B1, and so forth.

At the base station 103, data from the first PCM link 107 is collected until a complete block of encoded speech and/or data has been accumulated. The encoded speech portion of a complete block is 20 bytes long in the American PCM system (D-AMPS), and 260 bits (33 whole bytes) in the European GSM system. Then, the complete block of encoded speech or data is processed by a channel codec 117 which adds data for error detection and correction, and then reformats the data into the format shown in FIG. 3. This format, shown in FIG. 3, is used for transmitting data over the "air interface," that is, from the base station 103 to the mobile station 105. As illustrated, the air interface of known mobile telephone communications systems is oriented around 20 ms frames 301, each of which can be shared by three users. In the example shown, User 1 transmits 324 bits of its data (including 312 bits representing information of some kind) during the first 6.67 ms 303 of the air interface frame 301, User 2 transmits its data during the second 6.67 ms 305 of the frame 301, and User 3 transmits its data during the third 6.67 ms 307 of the frame 301. Then the process is repeated for the next air interface frame 301. This method of sharing the use of a single resource (i.e., the air interface frame) is commonly referred to as Time Division Multiple Access (TDMA), and is well known in the art.

The problem with the aforementioned system will now be presented. As described above, each of the TRA 109 and the channel codec 117 needs a complete block of data before any processing (i.e., data compression/expansion or reformatting) can be performed. It follows, then, that a complete block of data must be received from the first PCM link 107 before any of it can be processed. This introduces a delay equal to the transfer time for a complete block. This transfer time delay may be expressed as:

$$\text{delay} = \text{number of bits in block/channel capacity} \quad (1)$$

Equation (1) represents the delay that occurs when transmitting data in either direction between the PSTN 115 and the mobile station 105. In practice, a block of data consists of at least 159 bits of speech parameters, and more realistically may be 260 bits of user data plus approximately 32 bits of data for addressing and protection against errors on the PCM link. Also, for a connection with a nominal channel capacity of 64 kbit/s, the use of the channel formatting scheme shown in FIG. 2, in which a 64 kbit/s connection is shared by four multiplexed voice channels, results in an effective channel capacity equal to $\frac{1}{4} \times 64$ kbit/s = 16 kbit/s for each user. Consequently, the transfer delay in each direction may be computed to be between 159/16000 = 9.94 ms and 292/16000 = 18.25 ms.

Digital mobile telephony has quite long "built in" delays resulting from speech coding, channel coding, interleaving, and calculation times. The introduction of an extra delay for transfer of data from the TRA 109 to the base station 103 may lead to inconvenience when using the system, because the total delay exceeds what is acceptable.

Another drawback with the prior known system is the fact that if it is desired to multiplex a number of users that is not evenly divisible into 8 (since multiplexing is performed on a byte-by-byte basis), transmission capacity of the first PCM link 107 is wasted.

SUMMARY

It is therefore an object of the present invention to provide a method and apparatus that reduces the delays that result from the use of TDMA on the first PCM link 107.

It is another object of the present invention to provide a method and apparatus which permits multiplexing on the first PCM link 107 without wasting transmission capacity if the number of users is not evenly divisible into 8.

In accordance with one aspect of the present invention, the foregoing and other objects are achieved in a cellular radio system having switch means coupled to a base station by means of a pulse code modulation (PCM) link, by providing an apparatus comprising in the switch means, input means for inputting a plurality of user data blocks, each of the plurality of user data blocks corresponding to one of a plurality of users, and each user data block comprising an integer number of bytes of data; and formatting means, coupled to the input means and to a first end of the PCM link, for generating a PCM frame from the plurality of user data blocks, wherein each of the plurality of user data blocks occupies an integer number of consecutive bytes of the generated PCM frame. The base station, is provided with input means, coupled to a second end of the PCM link, for receiving a PCM frame; and channel encoding means, coupled to the input means, for generating an air interface frame from a plurality of user data blocks contained in a received PCM frame. Because each of the plurality of user data blocks occupies an integer number of consecutive bytes of the generated PCM frame, the user data block may be transmitted at the nominal channel capacity of the PCM link.

In yet another aspect of the invention, the base station has means for generating a timing control signal, and the switch means has input means for receiving the timing control signal. The switch means also has timing control means, coupled to the input means and to the formatting means, and responsive to the timing control signal for causing the formatting means to synchronize output of a generated PCM frame with generation of an air interface frame such that the generated PCM frame will arrive at the base station channel encoding means substantially just at a moment when the generated PCM frame is needed by the channel encoding means in order to generate the air interface frame without waiting for the generated PCM frame.

BRIEF DESCRIPTION OF THE DRAWINGS

The objects and advantages of the invention will be understood by reading the following detailed description in conjunction with the drawings in which.

DETAILED DESCRIPTION

Figure 1:
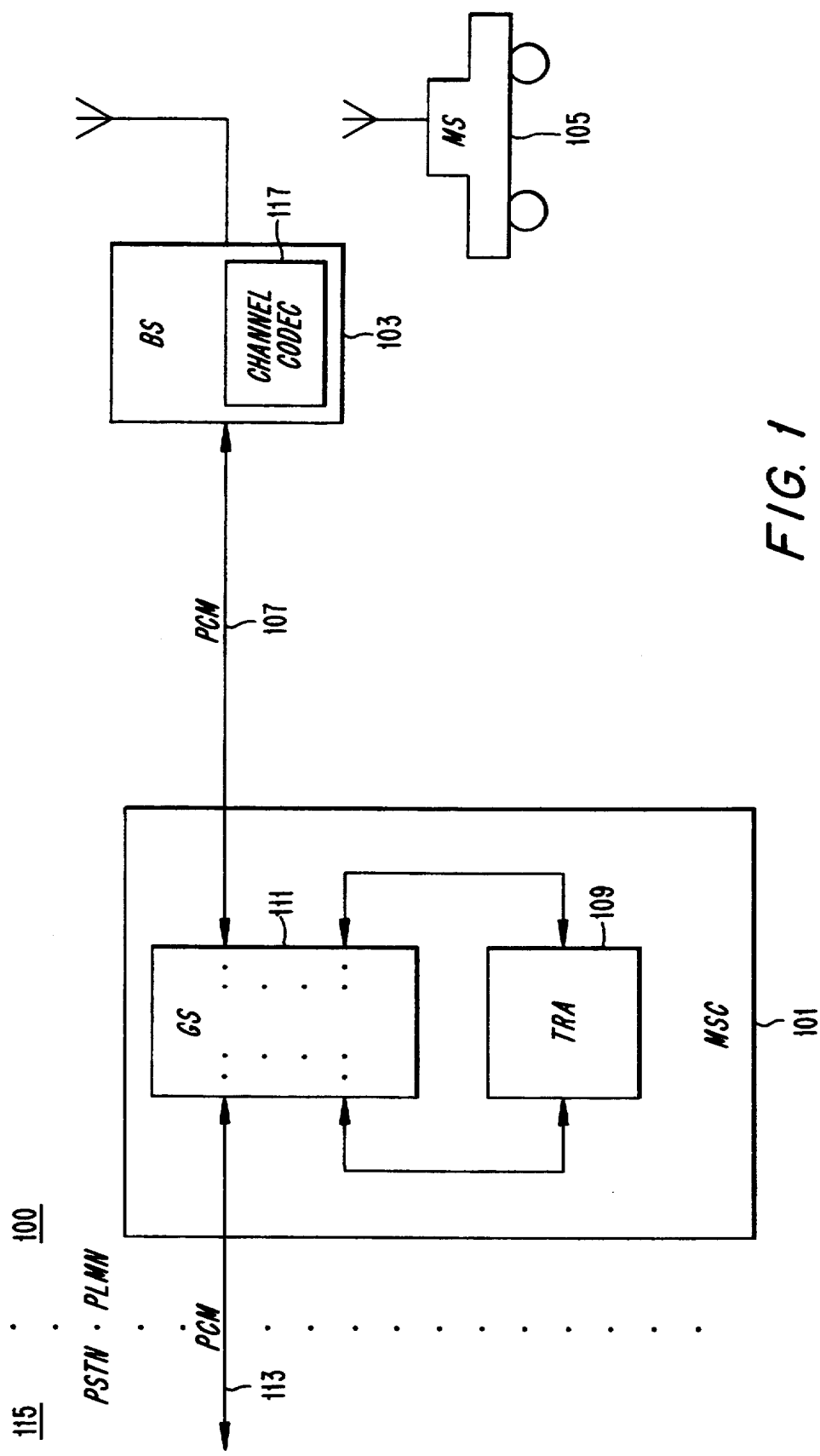
FIG. 1 is a block diagram of a cellular telephone communications systems including a first PCM link between a base station and a mobile services switching center including a transcoder and rate adapter.
Figure 2:
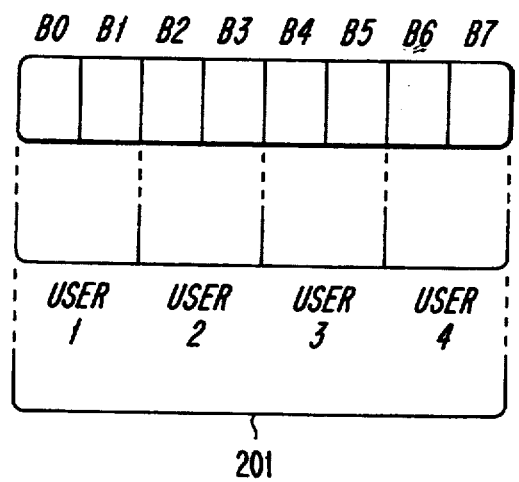
FIG. 2 is a diagram of a data format from an existing system for multiplexing connections on a PCM link.
Figure 3:
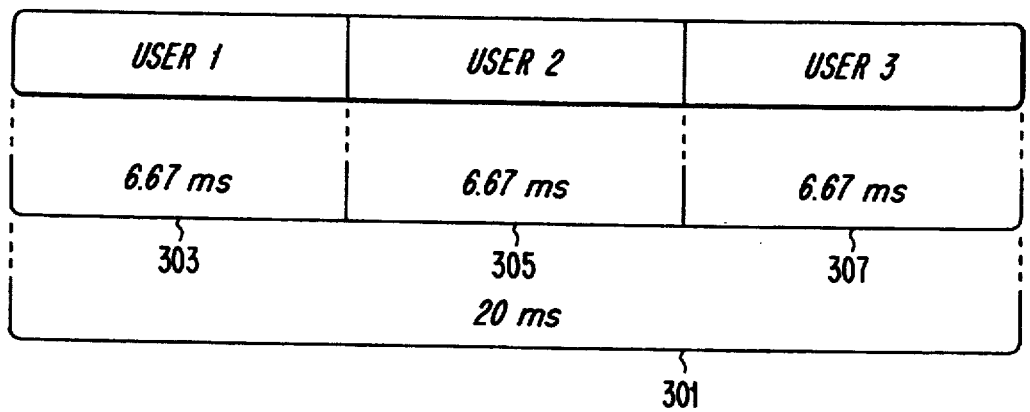
FIG. 3 is a diagram of the format that is used for transmitting data from the base station 103 to the mobile station 105.
Figure 4:
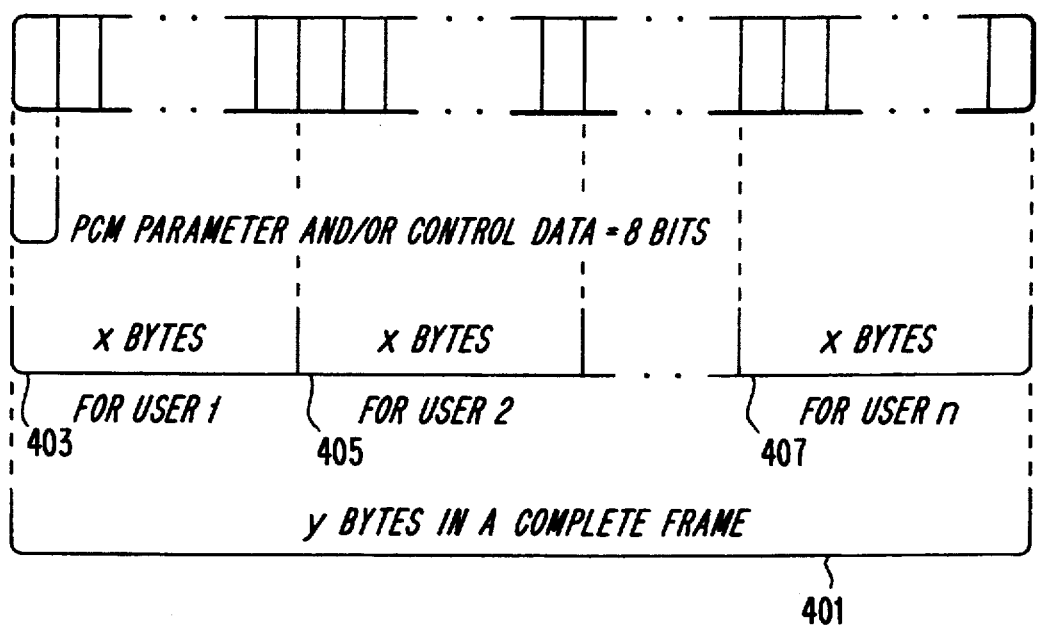
FIG. 4 is a diagram of a PCM frame format in accordance with the present invention.

A preferred embodiment of the present invention for reducing delay times caused by time sharing of a PCM link in a mobile telephone communications system will now be described. Referring now to FIG. 4, a PCM frame 401 of data bytes is shown. The size of the PCM frame 401 is the same as that used for transmitting data over the first PCM link 107 in the known systems. However, in accordance with the present invention, a different scheme for sharing the channel capacity among multiple users of the first PCM link 107 is used. As explained above, prior methods required users to multiplex their access to the first PCM link 107 on a byte-by-byte basis. Thus, where four users shared the first PCM link 107, each user could transmit only two bits for every 8 bits transmitted on the first PCM link 107. According to the present invention, this is no longer the case. Instead, each user is permitted to transmit uninterrupted data in consecutive bytes until a complete block of data has been sent. Because the block of data is defined to be smaller than the size of the PCM frame 401, this same activity can be repeated for other users. For example, as shown in FIG. 4, a block of user 1 data 403 is transmitted as the first x bytes in the PCM frame 401. Next, a block of user 2 data 405 parameter and/or control data is transmitted as the second x bytes in the PCM frame 401. This process continues until a block of user n data 407 is transmitted as the last x bytes in the PCM frame 401. This technique is then repeated for the next PCM frame 401 to be transmitted on the first PCM link 107.

Where the first PCM link 107 is capable of transmitting data at the rate of 64 kbit/s, the present invention provides the advantage that the first PCM link 107 may be shared by multiple users without degrading the rate at which each block of user data is transmitted. This is because the multiplexing occurs on a block-by-block basis, rather than on a byte-by-byte basis. For example, if a block is defined as 159 bits of data, these bits will be transmitted, uninterrupted, at the rate of 64 kbit/s, so that the total transmission time is 2.48 ms instead of the 9.94 ms required in the previous system. The reduction is even greater when the block size is defined to be a larger amount. For example, a block of 292 bits will be transmitted in $292/64000 = 4.56$ ms instead of the 18.25 ms previously calculated for the prior art system. The round trip savings in this example is therefore $18.25 \times 2 - 4.56 \times 2 = 27.4$ ms.

Figure 5:
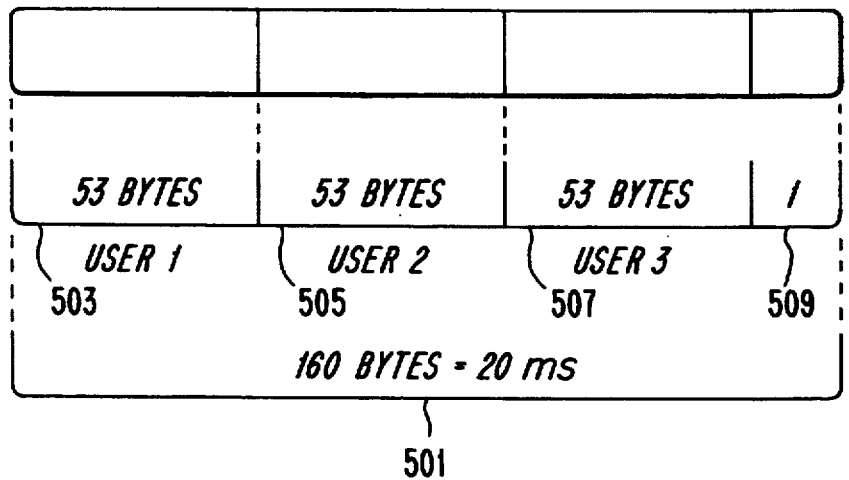
FIG. 5 is a diagram of a PCM frame formatted to accommodate 3 multiplexed users in accordance with the present invention.

Referring now to FIG. 5, a more detailed description of the preferred embodiment of the invention is shown. In this embodiment, each PCM frame 501 of data contains 160 bytes of data which, at the transmission rate of 64 kbit/s, can be transmitted over the first PCM link 107 in 20 ms. Each block of samples is defined to be 53 bytes long, so that the 160 byte PCM frame 501 can be shared by three users. If a user transmits fewer than 53 bytes of valid data, the remaining space is occupied by "dummy" bytes to fill out the allocated time slot. As shown, a block of user 1 data 503 is transferred in the first part of the PCM frame 501, followed by a block of user 2 data 505, and then a block of user 3 data 507. As only 159 bytes of data out of the 160 bytes available in the PCM frame 501 are allocated to carry user blocks, an extra byte 509 exists. In the preferred embodiment, the extra byte 509 is used to make it possible to adjust for bitslips between the transmitter and receiver timing, when using unsynchronized clocks, without losing any data. That is, when it is necessary to adjust the transmission timing of the PCM frame 501, the extra byte 509 may be eliminated (i.e., not transmitted) in order to advance the transmission of the remaining bytes in the PCM frame 501 without losing any valid data. The transfer time for each block of samples in this embodiment of the invention can easily be calculated as follows. Each block has a length of 53 bytes $\times$ 8 bits/byte = 424 bits. Therefore, $424/64000 = 6.63$ ms are required to transfer each block of samples, compared to $424/(64000/3) = 19.9$ ms required when using the method of the previously known system.

Figure 6:
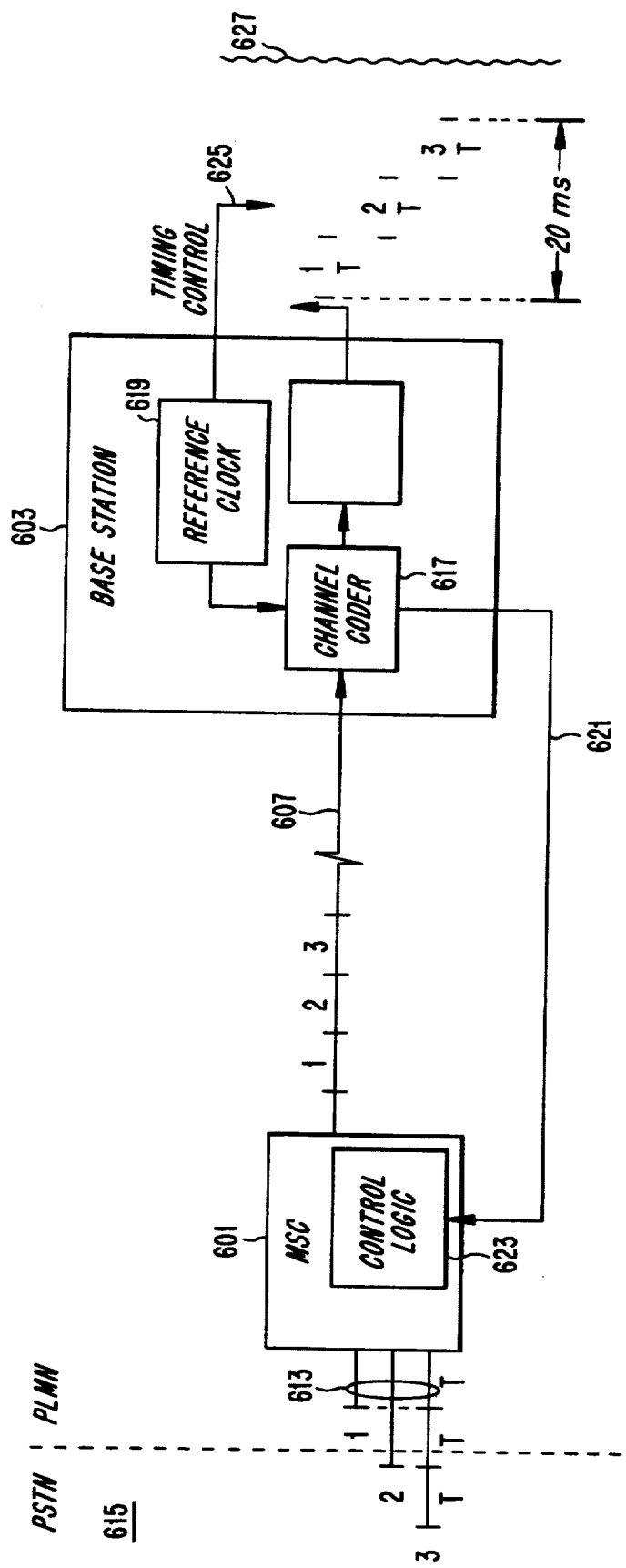
FIG. 6 is a block diagram of a mobile telephone communications system in which multiplexing on the PCM link is coordinated with multiplexing on the air interface so that, in accordance with another aspect of the present invention, no further delay is introduced.

Another aspect of the present invention takes advantage of the fact that both the PCM frame 501 and the air interface frame 301 are shared by three users. Referring now to FIG. 6, an MSC 601 is connected to a base station 603 by means of a first PCM link 607. The MSC 601 is also connected to a PSTN 615 by means of 3 second PCM links 613, each of which carries one communication channel. The MSC 601 is designed to compress (encode) the speech received from the 3 second PCM links 613, and to transmit them to the base station 603 in the form of a PCM frame 501 as described above. In addition, the base station 603 contains a reference clock 619 which controls the timing of the channel coder 617. Furthermore, a control signal 621, conveying information about the time difference between the input to the first PCM link 607 and the control timing for the air interface 627, is sent to the MSC 601. The control signal 621 is then input into control logic 623 which, in response to the control signal 621, causes the data being transmitted from the MSC 601 to the base station 603 by means of the first PCM link 607 to be synchronized in such a way that it arrives at the channel codec 617 substantially just at the moment when it is needed, so that it can be made available for transmission in the corresponding air interface slot without introducing any further transfer delays. The design of an appropriate reference clock 619, control signal 621 and control logic 623 may easily be performed by one skilled in the art, and is not described here in great detail. Such a design may be based on measurements of how long it takes a PCM frame 501 to arrive at the base station 603 from the MSC 601, and knowledge of when the PCM frame 501 needs to arrive in order to be available at the channel coder 617 for introduction into the air interface during the next slot. An appropriate control signal 621 can then be sent to the MSC 601. The control signal 621 may be sent as a signal that shares the PCM link bandwidth with encoded speech.

The invention has been described with reference to a particular embodiment. However, it will be readily apparent to those skilled in the art that it is possible to embody the invention in specific forms other than those of the preferred embodiment described above. This may be done without departing from the spirit of the invention. The preferred embodiment is merely illustrative and should not be considered restrictive in any way. For example, although the above description illustrates a particular embodiment which permits three users to share the first PCM link 107 without introducing further delay into the system, the inventive principles involved can be adopted to almost any number of users. Similarly, the channel capacity of the first PCM link 107 has illustratively been described as 64 kbit/s. However, the inventive concepts presented here may be equally applied to other PCM link bit rates, and may also be applied to the American PCM system, in which each byte transmitted on the PCM link comprises seven bits of user data and one bit that is used for channel associated signalling, so that a nominal 64 kbit/s channel has an effective data handling capacity of 56 kbit/s. Also, the first PCM link 107 is shown connecting the MSC 101 and the base station 103. However, it will be readily apparent to those skilled in the art that the inventive concepts described above are applicable in other cellular radio system configurations in which PCM channels are time shared. For example, the PCM link may connect a base station controller, serving more than one user, and a base station transceiver. Thus, the scope of the invention is given by the appended claims, rather than the preceding description, and all variations and equivalents which fall within the range of the claims are intended to be embraced therein.

What is claimed is:

1. In a cellular radio system having switch means coupled to a base station by means of a pulse code modulation (PCM) link, an apparatus comprising:
   in the switch means,
   input means for inputting a plurality of user data blocks, each of the plurality of user data blocks corresponding to one of a plurality of users, and each user data block comprising an integer number of bytes of data; and
   formatting means, coupled to the input means and to a first end of the PCM link, for generating a PCM frame from the plurality of user data blocks, wherein each of the plurality of user data blocks occupies an integer number of consecutive bytes of the generated PCM frame; and in the base station,
input means, coupled to a second end of the PCM link, for receiving a PCM frame; and
channel encoding means, coupled to the input means, for generating an air interface frame from a plurality of user data blocks contained in a received PCM frame.

2. An apparatus according to claim 1, wherein the PCM frame comprises at least one user data block and one adjustment byte for adjustment of transmitter and receiver timing when respective clocks of the switch means and the base station are not fully synchronized with one another.

3. An apparatus according to claim 1, further comprising:
in the base station, means for generating a timing control signal; and
in the switch means,
input means for receiving the timing control signal; and
timing control means, coupled to the timing control signal input means and to the formatting means, and responsive to the timing control signal for causing the formatting means to synchronize output of a generated PCM frame with generation of an air interface frame such that the generated PCM frame will arrive at the base station channel encoding means substantially just at a moment when the generated PCM frame is needed by the channel encoding means in order to generate the air interface frame without waiting for the generated PCM frame.

4. An apparatus according to claim 3, wherein the PCM frame comprises at least one user data block and one adjustment byte for adjustment of transmitter and receiver timing when respective clocks of the switch means and the base station are not synchronized with one another.

5. The apparatus according to claim 1, wherein the PCM link operates at a rate of 64 kbit/s.

6. In a cellular radio system having switch means coupled to a base station by means of a pulse code modulation (PCM) link, wherein the switch means includes formatting means for generating a PCM frame from a plurality of user data blocks, each corresponding to one of a plurality of users, and outputting the generated PCM frame onto the PCM link; and wherein the base station includes channel encoding means for generating an air interface frame from a plurality of user data blocks contained in a PCM frame received from the PCM link, an apparatus comprising:

in the base station, means for generating a timing control signal; and
in the switch means,
input means for receiving the timing control signal; and
timing control means, coupled to the formatting means, and responsive to the timing control signal for causing the formatting means to synchronize output of the generated PCM frame with generation of an air interface frame such that the generated PCM frame will arrive at the base station channel encoding means substantially just at a moment when the generated PCM frame is needed by the channel encoding means in order to generate the air interface frame without waiting for the generated PCM frame.

7. In a cellular radio system having switch means coupled to a base station by means of a pulse code modulation (PCM) link, a method of multiplexing use of the PCM link comprising the steps of:
inputting a plurality of user data blocks, each of the plurality of user data blocks corresponding to one of a plurality of users, and each comprising an integer number of bytes of data;
generating a PCM frame from the plurality of user data blocks, wherein each of the plurality of user data blocks occupies an integer number of consecutive bytes of the generated PCM frame; and
outputting the generated PCM frame onto the PCM link.

8. In a cellular radio system having switch means coupled to a base station by means of a pulse code modulation (PCM) link, wherein the switch means includes formatting means for generating a PCM frame from a plurality of user data blocks, each corresponding to one of a plurality of users, and outputting the generated PCM frame onto the PCM link; and wherein the base station includes channel encoding means for generating an air interface frame from a plurality of user data blocks contained in a PCM frame received from the PCM link, a method of operating the cellular radio system comprising the steps of:
in the base station, generating a timing control signal;
in the switch means, receiving the timing control signal; and
in the switch means, using the timing control signal to cause the formatting means to synchronize output of the generated PCM frame with generation of an air interface frame such that the generated PCM frame will arrive at the base station channel encoding means substantially just at a moment when the generated PCM frame is needed by the channel encoding means in order to generate the air interface frame without waiting for the generated PCM frame.

* * * * *